Figure 1:
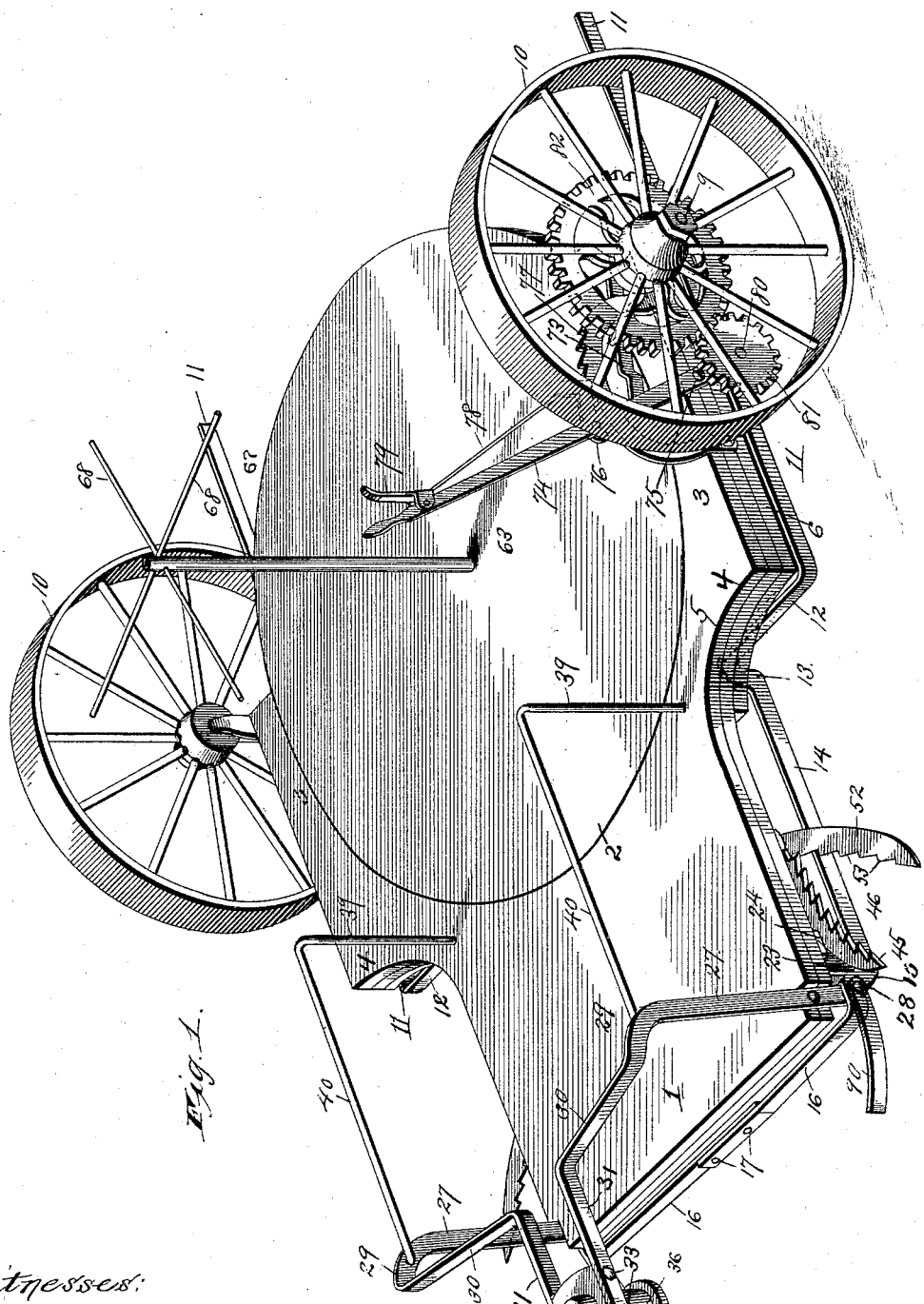

(No Model.) 4 Sheets—Sheet 1.

W. F. WILLIAMS.
CORNSTALK HARVESTER.

No. 476,849. Patented June 14, 1892.

Witnesses:
G. Y. Short Jr.
Jno. L. Condron

Inventor:
Wm. F. Williams
By Higdon & Higdon
Attorneys

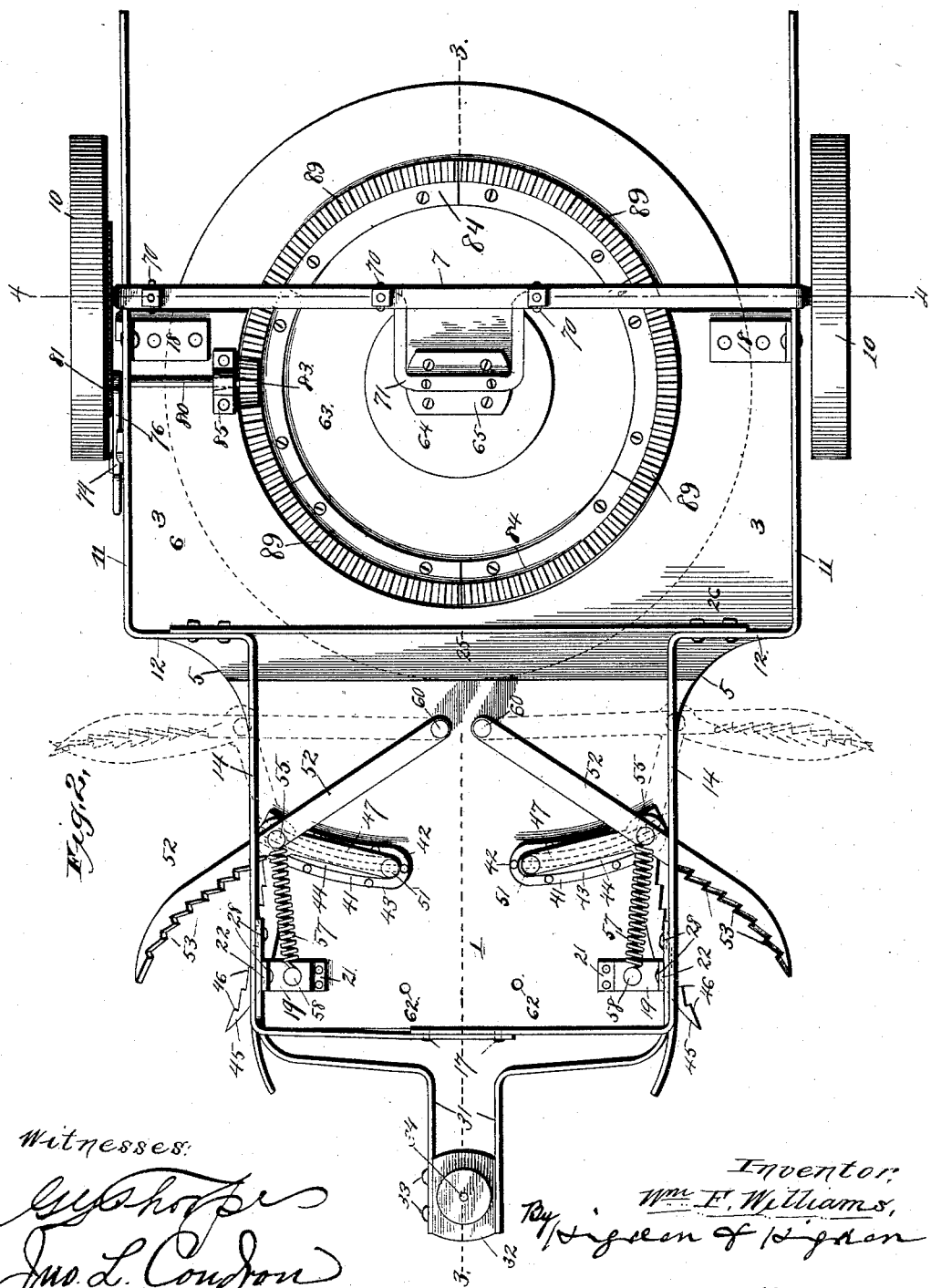

(No Model.) 4 Sheets—Sheet 3.
W. F. WILLIAMS.
CORNSTALK HARVESTER.
No. 476,849. Patented June 14, 1892.
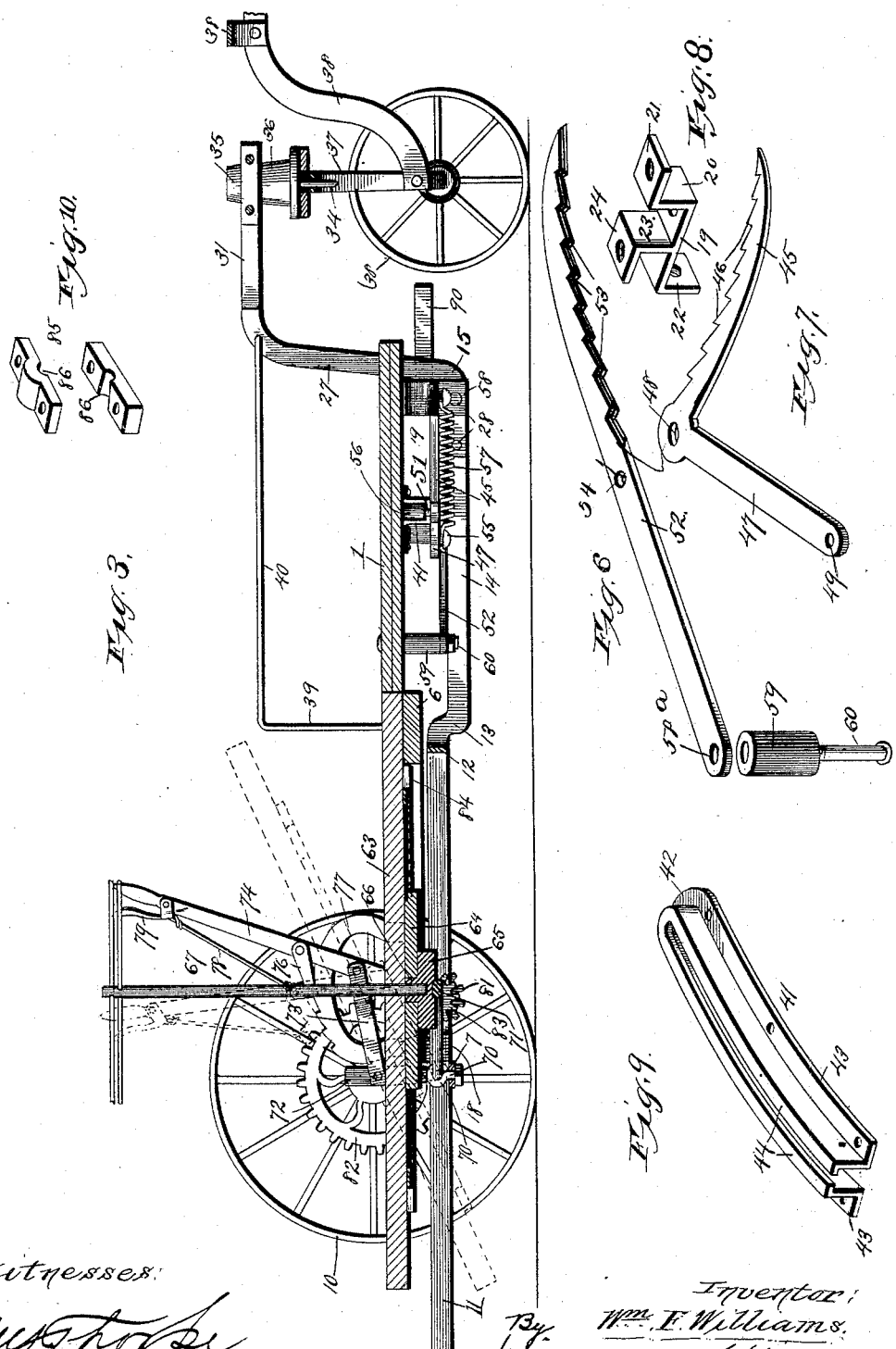

(No Model.) 4 Sheets—Sheet 4.
W. F. WILLIAMS.
CORNSTALK HARVESTER.
No. 476,849. Patented June 14, 1892.
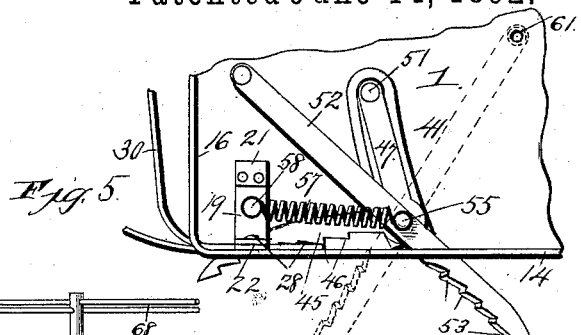
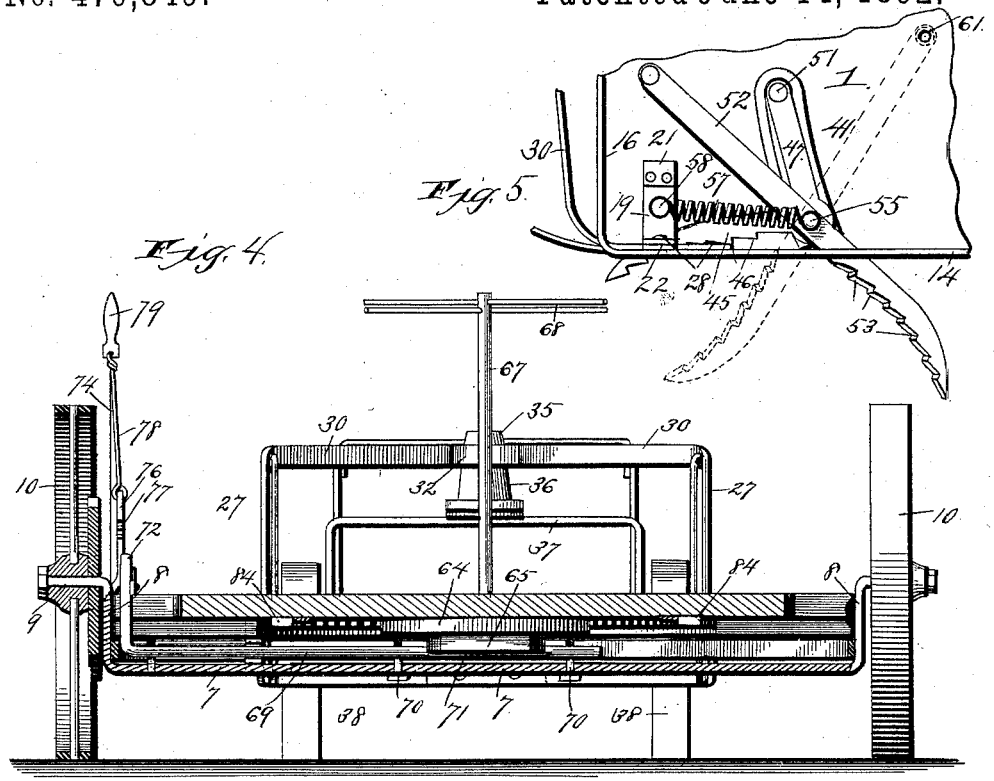
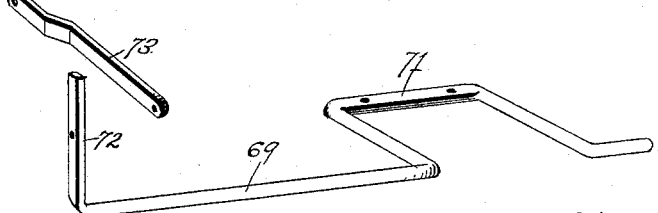
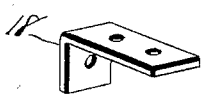
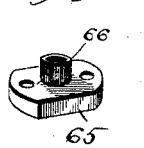
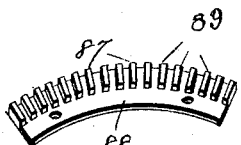
Witnesses:
G. Y. Thorpe
Jno. L. Condon
Inventor
Wm. F. Williams.
By Higdon & Higdon
Attorneys.
THE NORRIS PETERS CO., PHOTO-LITHO., WASHINGTON, D. C.

UNITED STATES PATENT OFFICE.

WILLIAM F. WILLIAMS, OF KANSAS CITY, MISSOURI.

CORNSTALK-HARVESTER.

SPECIFICATION forming part of Letters Patent No. 476,849, dated June 14, 1892.

Application filed November 5, 1891. Serial No. 410,972. (No model.)

*To all whom it may concern:*

Be it known that I, WILLIAM F. WILLIAMS, of Kansas City, Jackson county, Missouri, have invented certain new and useful Improvements in Cornstalk-Harvesters, of which the following is a full, clear, and exact description, reference being had to the accompanying drawings, forming a part hereof.

My invention relates to that class of agricultural implements which are designed to cut cornstalks, canes, and similar vegetation from the stubs while the stalks or canes are standing in the field; and the objects of my invention are to produce a cornstalk or cane harvester which shall be simple, durable, and comparatively inexpensive in construction and rapid and effective in operation, and by means of which both drilled corn, which is in straight rows in but one direction, and check-rowed corn, which is in straight rows in both directions, can be properly harvested; also, to produce a machine the cutting mechanism of which shall be entirely automatic in its action and shall effectively cut both upright stalks or canes and those which occupy a more or less inclined position.

A still further object of my invention is to produce a harvester the platform of which shall automatically revolve in consequence of the progressive movement of the machine, and thus facilitate and expedite the operation of forming the shocks; and, furthermore, to provide said platform with dumping attachments which will enable the shock after being formed upon the platform to be readily discharged from the machine in such manner as to assume the required erect position upon the ground without arresting the progress of the machine.

A still further object of my invention is to produce a cornstalk or cane harvester which shall be of light weight and of easy draft, so as to be readily propelled in its work by the draft-animals.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1 is a perspective view of a cornstalk or cane harvester embodying my invention. Fig. 2 is an inverted plan view of the same. Fig. 3 is a central vertical longitudinal section of the same on the line 3 3 of Fig. 2. Fig. 4 is a transverse vertical section of the same on the line 4 4 of Fig. 2. Fig. 5 is an inverted plan view of a portion of the front of the machine-frame, showing one set of cutters adjusted to operate fixedly for cutting drilled cornstalks. Fig. 6 is a detached perspective view of one of the lower cutting-knives and its sleeve. Fig. 7 is a detached perspective view of one of the upper cutting-knives. Fig. 8 is a detached perspective view of one of the brackets to which the front ends of the cutter-retracting springs are attached. Fig. 9 is a detached inverted perspective view of one of the segmental guides for the lower cutters. Fig. 10 is a detached perspective view of the divided bearing for the platform-revolving shaft. Fig. 11 comprises a detached perspective view of the rock-shaft for tilting the platform and a similar view of the connecting-link for said shaft. Fig. 12 is a detached perspective view of the step-bearing for the shock-forming standard. Fig. 13 is a detached perspective view of one of the toothed segments of the gear-ring of the platform. Fig. 14 is a detached perspective view of one of the brackets for connecting the side bars to the body of the machine.

In the said drawings, 1 designates the front or body portion of the machine, the said front or body portion being of approximately rectangular form and of such width as to pass readily between two adjacent rows of standing cornstalks or canes. The rear margin 2 of this front or body portion is, however, of segmental form. From the sides 4 of said front or body portion project two rearward extensions 3, the inner sides or margins of which are of segmental form, their curves constituting rearward continuations or prolongations of the segmentally-curved margin of the front or body portion of the machine. These rearwardly-extending portions 3 are of such width that their outer sides project outwardly beyond the sides of the front or body portion about the proportionate distance shown in the drawings, and the front margins 5 of said extensions 3 are also preferably of concave curvature, as shown.

The front or body portion 1 and its rearward extensions 3 are preferably constructed of two thicknesses of material, as shown, for the purposes of strength; but it is obvious that said parts may be constructed of a single thickness of material sufficient to bear the weight and resist the strains to which they are subjected during the operation of the machine.

6 designates a support which is bolted or otherwise secured to the under side of the front or body portion 1 and of the rearward extensions 3, and which is of such length as to extend from side to side of the machine and of such width as to extend rearwardly beyond the rear margin 2 of the front or body portion 1, and also inward beyond the inner margins of the rearward extensions 3, for a purpose to be hereinafter explained.

7 designates the rear carrying-axle of the machine, the said axle being preferably of flattened form and extending horizontally beneath the rear part of the machine from side to side of the same and being bolted or otherwise suitably secured at its outer portions to the rear ends of the rearward extensions 3. The end portions 8 of this axle extend upward, so as to impart an approximately U form to the axle, and the spindles 9 of the axle extend outward from the upper ends of the parts 8 thereof. Upon these spindles 9 are mounted the rear carrying-wheels 10 of the machine, the said wheels being of the usual or any preferred type of construction and arranged to turn upon said spindles.

11 designates two bars of metal, each of which extends forwardly from a point beyond the rear of the machine and thence forward parallel with the outer side of the corresponding rear extension 3 to the angle of juncture of the front and outer sides of said extension. From this point each of the bars 11 extend horizontally inward, as at 12, beneath the front part of the said corresponding extension. At its inner terminus this inward extension 12 of the bar 11 extends downward, as shown at 13, and thence forward horizontally parallel with the corresponding side of the front or body portion 1, as shown at 14, the arrangement being such that the rear portion 11 of the bar is raised above the level of the front portion 14 of the same, for a purpose to be hereinafter explained. The portion 14 of the bar extends forward to the point of juncture of the front and corresponding side margins of the body portions 1 of the machine, and at its front end this portion 14 of each bar is bent slightly upward, as shown at 15. From this bend 15 each of the bars extend inward parallel with the front margin of the body portion 1, as shown at 16, and the inner extremities of these portions 16 overlap each other and are secured together by suitable bolts 17 or other equivalent means. The rear portions 11 of these bars are secured to the under sides of the rearward extensions 3 by means of two angle-brackets 18, each of which is of inverted-L shape, the upper inward-extending horizontal flange of each of said brackets being bolted to the under side of the corresponding extension 3, and the vertical body portion of said bracket being similarly bolted to the portion 11 of the corresponding bar, the rearwardly-extending ends of the bars serving to guard the rear of the dumping-platform hereinafter described. The front ends of the portions 14 of the side bars are connected to the under side of the body portion 1 of the machine by brackets 19. (See, also, Fig. 8.) Each of these brackets 19 is composed of a rectangular body portion, from the inner end of which extends a flange 20, the upper edge of which is formed with an inward-extending flange 21, which is bolted to the under side of the body portion 1 of the machine. The opposite end of the body portion of this bracket is formed with a downwardly-extending flange 22, which is bolted to the adjacent portion of the part 14 of the corresponding side bar. From the under side of the body portion of each of these brackets 19 extends upward a flange 23, which is located midway of said body portion and which extends parallel with the flange 20, with which flange 20 said flange 23 corresponds in length. At its upper end the flange 23 is formed with an outwardly-extending horizontal flange 24, which is bolted, also, to the under side of the body portion 1 of the machine. Thus it will be seen that the side bars are securely attached to the body of the machine by the brackets 18 and 19, as before stated. The said side bars are further braced and strengthened by a horizontal connecting-bar 25, which extends transversely beneath the machine, and the ends of which are secured by bolts 26 or equivalent means to the rear sides of the inwardly-extending portions 12 of the two side bars, and it will be observed that the rear portions 11 of these side bars rest upon the outer end portions of the rear carrying-axle 7. From the front upwardly-extending portions 15 of the side bars extend two vertical bars 27, the lower ends of which are secured to the said bends 15 by the bolts 28, one of which bolts also serves to secure the flange 22 of the corresponding bracket 19 to the portion 14 of the corresponding side bar. At its upper end each of these bars 27 is curved forward, as at 29, and then inward, as at 30, above and toward the middle of the front of the body portion 1, the inner extremities of these portions 30 being, however, separated from each other, as shown in Figs. 1 and 2. From the inner extremities of these portions 30 each of the bars 27 is continued horizontally forward, as at 31, the said forwardly-extending horizontal portions 31 being parallel with each other and embracing between their outer extremities a block 32, which is preferably secured in position by suitable transverse through-bolts 33. Through this block 32 extends a vertical pendent king-bolt 34, which is formed at its upper end with a head 35, which is located above the block 32, and said king-bolt is also surrounded below the block 32 by a sleeve or enlargement 36.

37 designates the front axle of the machine, said axle being of inverted-U form and having the front carrying-wheels 38, mounted upon the usual spindles at its ends. The king-bolt 34 passes downward through the middle of the upper portion of the front axle 37, and to the ends of this axle are pivotally or otherwise secured the rear or lower ends of the thills 38, to which the draft pole or tongue of the machine is connected, the whiffletrees being attached to the cross-bar 39 at the front part of said thills. At the front end of the machine are located two standards 39, which rise vertically from the opposite sides of the front or body portion 1 of the machine and the upper ends of which are bent and continued horizontally forward to form guard-rails 40, the front ends of said guard-rails being secured in suitable manner to the upper ends of the two standards or bars 27, before described.

I will now proced to describe the construction and arrangement of the cutting apparatus of my improved harvester.

To the under side of the front or body portion 1 of the machine are secured two segmental guides 41, each of which is of approximately elongated-U form. The two arms of the guide, however, are each curved segmentally, as shown, and each extends parallel with the other outward and rearward when the guides are in proper operative position. The inner ends of these two arms are integrally united by a bend 42, and the base 43 of the guide is in the form of an outwardly-extending flange, through which extend the bolts which secure the guides in position. The lower edges of the guide-arms are formed with inwardly-extending flanges 44 for a purpose to be hereinafter explained.

45 designates the upper cutters, the blades of which are preferably of segmental form and the cutting-edge of each of which is formed with any suitable number of inwardly-inclined and rearwardly-beveled teeth or serrations 46. From the inner end of each of these cutting-blades extends an arm 47, which unites with the blade at approximately a right angle, an eye 48 being formed at the point of juncture of the arm 47 with the blade 45 and a second eye 49 being formed in the opposite end of the arm 47. A suitable pin 51 is inserted into the eye 49 of the arm 47, and said pin is loosely surrounded by a revoluble sleeve or roller 56, which works between the guide-arms of the guide 41 and the lower end of which rests upon the upper sides of the two flanges, the pin 51 extending upward between the two flanges 44, and the arrangement being such that the flanges 44 retain the rollers within the guide-arms, and consequently prevent the inner ends of the arms 47 from dropping downward.

52 designates the lower cutters, each of which is of the form of an elongated bar, the outer portion or blade proper of which is of slightly-segmental form and the cutting-edge of which is formed with any suitable number of forwardly and inwardly extending beveled teeth or serrations 53. The inner end of the outer portion or blade proper of the bar 52 of each of these cutters is formed with an eye 54, through which passes a pin 55, the said pin passing, also, through the eye 48 of the upper cutter 45. The outer portions or blades of these cutters rest and slide upon the upper sides of the portions 14 of the side bars above described and work between said side bars and the under sides of the front or body portion 1 of the machine. To the pins 55 are connected the rear ends of two spiral retracting-springs 57, the front end of each of which is similarly connected to a second pin 58, which projects downward from the body portion of the corresponding bracket 19, before described.

The inner end of each cutter 52 is formed with an eye 58$^a$, through which is inserted a pin 60, said pins being surrounded by sleeves or tubular standards 59 and entering at their upper end sockets 61, (see, also, Fig. 5,) which are formed in the rear parts of the under side of the body portion 1 of the machine, the said standards or sleeves 59 preserving the required horizontal positions of the cutters 52. It will be seen that the spiral retracting-springs 57 normally retain the cutting-blades in the position shown in solid lines in Figs. 1 and 2—that is to say, the upper cutting-blade 45 is held at the forward limit of its permitted movement, its roller 50 being held against the inner end or bend of the guide 41, while the lower cutting-blade 52 is also held in a forwardly-inclined position, the serrated cutting-edge of the upper cutter 45 facing rearwardly and the serrated cutting-edge of the cutting-blade 52 facing forwardly. Now as the machine is drawn forward the lower blade will repeatedly strike the cornstalks, the teeth preventing the blade from slipping off of said stalks, and the said cutters will be pressed rearward by the stalks. These rearward movements of the lower cutting-blades draw the upper cutter-blades 45 outward and rearward, causing them to close upon the lower blades after the manner of the blades of shears, as shown in dotted lines in Fig. 2, and thus instantly sever the stalks from their stubs, the described movements of the upper blades being guided and assured by the movements of the rollers 56 in the guides 41, above described. As soon the cutter-blades have severed a stalk from its stub the spring 57 returns the cutting-blades to their normal described position in readiness for engagement with and severance of a succeeding stalk. It is to be understood that this adjustment and operation of the cutters is made when the latter are to sever cornstalks which have been planted by check-rower.

Referring now to Fig. 5, I will describe the adjustment of the cutters for severing stalks which have been planted by drilling. The pins 60 of the lower cutters 52 are removed from the sockets 61 and are inserted into two sockets 62, which are formed in the front part of the under side of the body portion 1, the sleeves 59 being retained upon the pins as before. This throws the inner parts of the bars 52 forward and inward, causing the outer portions or blades of the lower cutters to incline outwardly and rearwardly. This adjustment also causes the blades 45 of the upper cutters to lie at the forward limits of their movement, pressing their inner ends inward and forcing their rollers 56 against the inner ends or bends 42 of the guides. Thus the cutters are held firmly in stationary position and only the blades of the lower cutters 52 come into contact with and sever the cornstalks, the upper cutters 45 being idle.

I will now proceed to describe the revoluble shock forming and dumping mechanism of my improved harvester.

63 designates a platform, which is of circular form marginally and which is located immediately back of the front or body portion 1 of the machine. This platform is provided on its under side with a central reinforce-piece 64, also preferably of circular marginal contour, beneath which is bolted or otherwise suitably secured the base 65 of a vertical step-bearing 66, which extends upwardly through the middle or center of the reinforce-piece 64. A vertical standard 67 is inserted removably at its lower end through the center of the platform 63, and also removably into the step-bearing 66. This standard is preferably of gas-pipe, but may be of any other suitable or preferred material, and extends vertically upward from the platform, as shown. At its upper end this standard carries two cross-bars 68, which extend transversely through the upper end of the standard at right angles to each other, one of said cross-bars being permanently attached to the standard and the other cross-bar being removably inserted through said standard.

69 designates a rock-shaft, which rests upon the rear axle 7 of the machine and which is connected to said axle so as to rock thereon by any suitable number of eyebolts 70, which surround the said shaft, and the stems of which pass through the said axle. The inner portion of this rock-shaft is formed with a U-shaped section 71, which is bolted or otherwise secured to the under side of the base 65. The outer end of this rock-shaft is formed with a rock-arm 72, to which is pivotally connected the rear end of a link 73, the front end of said link being similarly connected to the lower part of a hand-lever 74. This hand-lever is pivoted, as at 75, upon the adjacent outer side of the body portion of the machine. At its lower portion this lever carries a pivoted pawl 76, the tip of which engages the teeth of a rack-sector 77, which is bolted upon the adjacent side of the body portion 1 of the machine. Through the lower extremity of this lever 74 extends the outer portion of a short horizontal shaft 80, which carries at its outer end a gear-pinion 81, this gear-pinion meshing with a gear-wheel 82, which turns with the hub of the corresponding rear carrying-wheel 10. The inner end of this shaft 80 carries a beveled gear-pinion 83, the teeth of which mesh with the teeth of a gear-ring 84, which is secured to the under side of the platform 63, (the precise construction of this gear-ring being hereinafter fully explained). The inner portion of this shaft 80 also passes through a divided bearing 85, (see Fig. 10,) which is composed of two elongated sections having each a conical half-bearing 86, in which the inner portion of the shaft 80 rests and which permits the shaft to be thrown out of gear with the gear-ring 82 of the platform 63, as will be presently explained.

The gear-ring 84 is composed of four or any number preferred of segmental sections 87, each of which is formed with a lateral base-flange 88, through which are inserted the bolts which secure the sections to the under side of the platform 63, the gear-teeth 89 of said sections being formed on the under side of their body portions, as shown. It will thus be seen that as the machine is drawn along with its platform in normal horizontal position the revolution of the rear carrier-wheel, which carries the gear-wheel 82, imparts rotary movement to the gear-pinion 81, and thus to the shaft 80 and the beveled gear-pinion 83. The gear-pinion 83 imparts revolution to the platform 63, causing the standard 67 to likewise revolve, and thus bring the spaces between the arms 86 successively opposite the operators standing upon the body portion 1 of the machine. As fast as the stalks are cut the operators place them between the arms, the platform continuing its revolution, and the shock is thus formed. As soon as the shock has been completed one of the cross-bars 68 is drawn out of the standard 67, and the standard is then lifted from the platform by the remaining cross-bar, which is grasped by the attendants for this purpose. The lever 74 is now drawn backward, tilting the platform 63 downward, as shown in dotted lines in Fig. 3, the inclination of the platform being such as to permit the shock to slide rearwardly from the platform and reach the ground in erect position. This tilting movement of the platform causes the rock-shaft 69 to fulcrum in its eyebolts 70, and also causes its bend 71 to rise and turn in the arc of a circle, so as to effect the described movement of the platform. The backward movement of the hand-lever 74 in tilting the platform 63 causes the lower end of the lever to move forward a sufficient distance to move the gear-pinion 81 out of engagement with the gear-wheel 82, the conical bearing 86 permitting the shaft 90 to move laterally for this purpose, and the operation is such that as soon as the hand-lever 74 is moved to tilt the platform 63 the rotation of said platform is automatically stopped.

In order to insure the action of the cutters upon all of the cornstalks or canes, a pair of forwardly and inwardly extending bars or gatherers 90 are bolted or otherwise secured to the outer sides of the body portion 1 of the machine and serve to direct the stalks to the cutters. It will be seen that, owing to the upward bends 13 of the side bars of the machine, the stubs of the cut stalks will not be struck by the rear part of the machine, and hence said stubs offer no impediment to the progress of the machine, as they would if the extensions 3 were so low as to strike the stubs.

From the above description it will be seen that I have produced a corn and cane harvester which is simple, durable, and inexpensive in construction, which is rapid and effective in its operation and of easy draft, and which is adapted to cut both drilled cornstalks and cornstalks or canes planted by check-rowers.

Having thus described my invention, what I claim as new therein, and desire to secure by Letters Patent, is—

1. A corn and cane harvester comprising a suitable vehicle, cutters pivoted in pairs at opposite sides of the vehicle and operating, as shears, solely by contact of one member of each pair with the stalk to be severed, a retracting-spring connected to the vehicle and also to the contacting cutter of each pair, and a guide also connected to the vehicle and engaging the inner end of the companion cutter, substantially as set forth.

2. A corn and cane harvester comprising a suitable vehicle, open segmental guides located beneath the front of said vehicle and closed at their inner ends, V-shaped cutters pivoted beneath the vehicle-body and carrying rollers at their inner ends, which work within said guides, companion cutters pivotally connected at their inner ends to the under side of the body of the vehicle and each pivotally connected to the angle of the corresponding V-shaped cutter, and retracting-springs, each connected at one end to the connected parts of one pair of cutters and at its opposite end to the under side of the vehicle, substantially as set forth.

3. A corn and cane harvester comprising a vehicle-body and a revoluble dumping-platform located at the rear of the vehicle, a removable vertical standard carried by said platform, and a permanent and also a removable cross-bar carried by the upper part of the standard, substantially as set forth.

4. A corn and cane harvester comprising a vehicle-frame mounted upon a rear carrying-axle, a rock-shaft having a U-shaped bend and mounted above said axle, a tilting platform connected to said shaft, a rack-segment carried by the vehicle-frame, and a tilting lever having a grip-pawl engaging the rack and connected to the rock-shaft, substantially as set forth.

5. A corn and cane harvester comprising a suitable vehicle, open segmental guides having closed inner ends and secured beneath the body portion of the vehicle, and cutters arranged in pairs at opposite sides of the vehicle and operative at times as shears, a retracting-spring connected to one of the cutters of each pair and vehicle-body, separate sockets for the inner end of each companion cutter, located, respectively, at the rear of and in front of the guides, and detachable pivots for the inner ends of the cutters, arranged to enter said sockets, the front sockets serving to set the companion cutters rigidly and to hold the spring-connected cutters in innermost position, substantially as set forth.

In testimony whereof I affix my signature in the presence of two witnesses.

WILLIAM F. WILLIAMS.

Witnesses:
H. E. PRICE,
JNO. L. CONDRON.